April 2, 1946. W. W. DEWHURST 2,397,844
SIGNALING APPARATUS
Filed Oct. 1, 1942 2 Sheets-Sheet 1
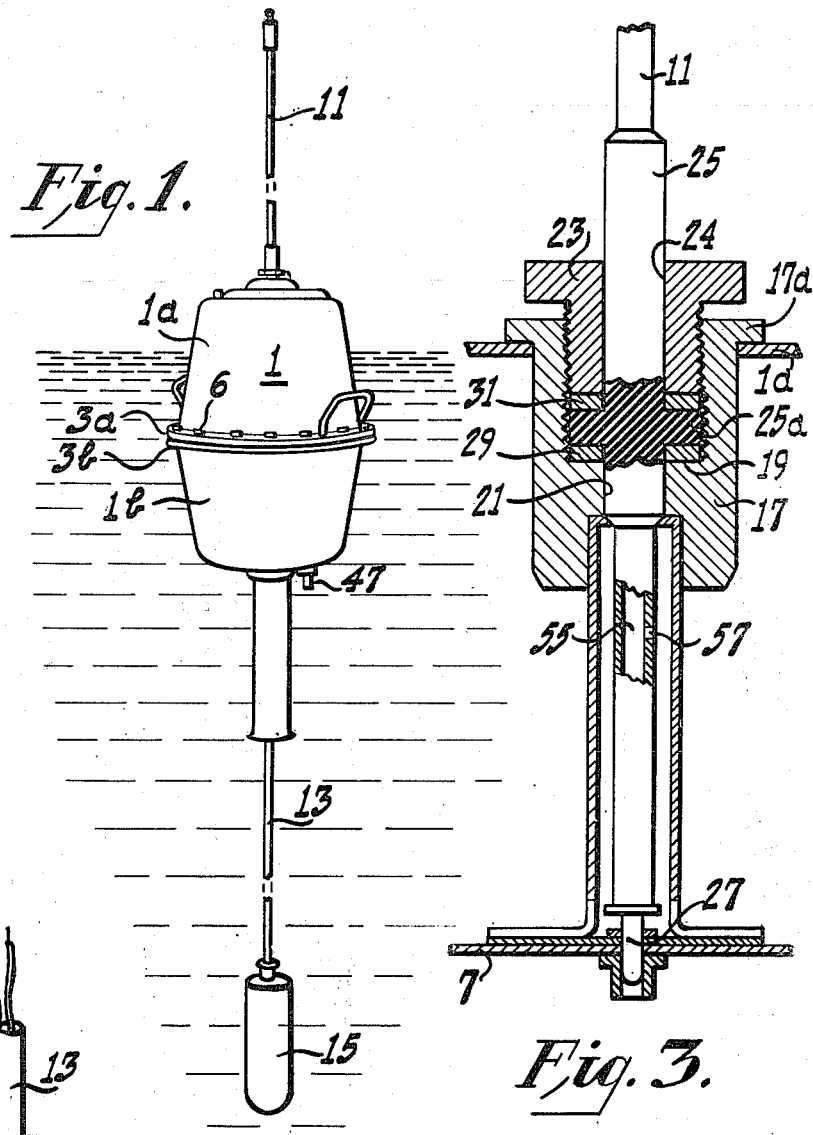
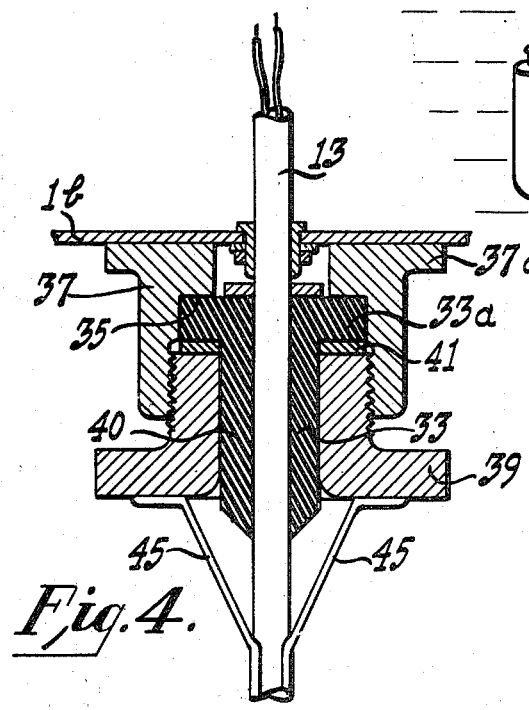
Inventor
WALLACE W. DEWHURST
By CD Tuska
Attorney

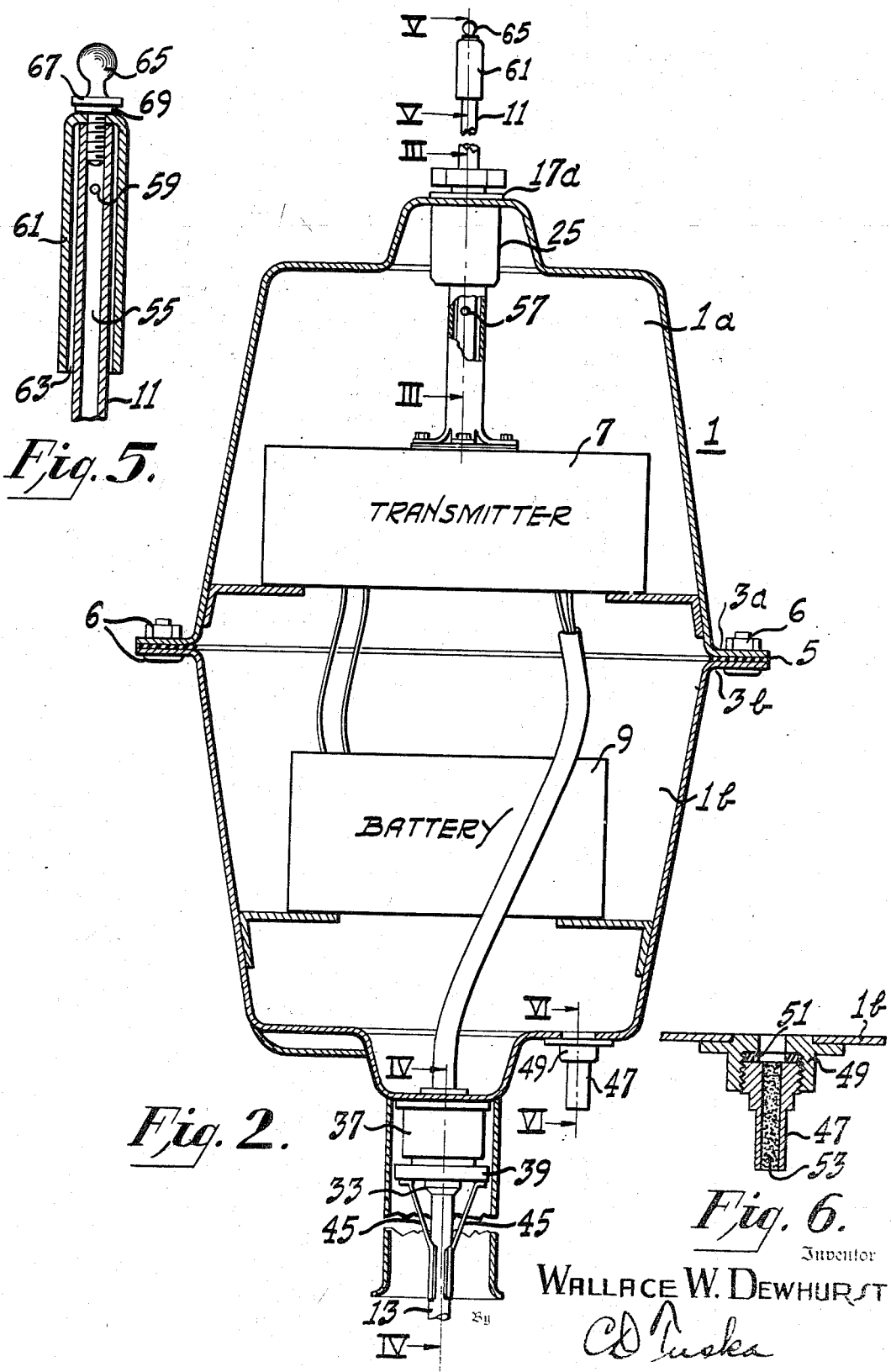

Patented Apr. 2, 1946

2,397,844

UNITED STATES PATENT OFFICE 2,397,844

SIGNALING APPARATUS

Wallace W. Dewhurst, Haddon Heights, N. J., assignor to Radio Corporation of America, a corporation of Delaware Application October 1, 1942, Serial No. 460,342

5 Claims. (Cl. 177—386)

This invention relates to signaling apparatus, and more particularly to radio transmitting apparatus especially adapted for use in submarine signaling.

In the course of naval operations, it is often desirable to ascertain the presence of submarine objects within a prescribed area. Various detecting devices have been provided for this purpose. Where the operations are of a military character, it is also desirable, if not even essential, that the detecting devices employed be precluded from falling into the hands of the enemy after they have served their intended purpose. In this respect, detecting and signaling devices of the prior art have not always been successful.

The primary object of my present invention is to provide improved detecting and signaling apparatus for accomplishing the aforementioned purpose in connection with naval operations.

More particularly, it is an object of my present invention to provide an improved detecting and signaling apparatus which becomes expended after a predetermined time interval beyond which its usefulness does not extend.

Another object of my present invention is to provide improved detecting and signaling apparatus for submarine use which is fairly simple in construction, highly efficient in use, and relatively inexpensive in cost.

In accordance with this invention, I provide a normally fluid tight casing which constitutes a buoy and within which suitable radio apparatus, such as a transmitter, is housed. The casing is normally filled with a quantity of air sufficient to enable it to float on water. Suspended from the buoy or casing is a suitable electro-acoustical translating device, such as a microphone, which is entirely immersed in the water, this device constituting the input to the transmitter. The casing also carries an antenna which is coupled to the output of the transmitter and which radiates signal energy corresponding to the acoustical energy picked up by the microphone. The antenna, which extends upwardly from the casing above the surface of the water, is constituted by a hollow, elongated rod having communication with both the interior of the casing and with the atmosphere. Below the water-line, the buoy is provided with a tubular inlet member which is normally stoppered with a water soluble stopper. This stopper is gradually dissolved by the water while the buoy floats thereon, and when it has become entirely dissolved, the water rushes into the casing and forces the air therein out throughout the hollow antenna.

In military operations, it may be desirable to know, for example, whether there are any submarines present within a prescribed area relative to a convoy. For this purpose, a detecting device as above described may be dropped overboard from one of the ships at regular intervals, say fifteeen or twenty miles. Should a submarine appear within the radius to which the microphone is sensitive, the apparatus will immediately transmit a signal which can be picked up by a radio receiver on board ship, and necessary action can thereafter be taken to remove the submarine from the danger zone. As the buoy floats on the water, the soluble stopper is gradually dissolved thereby. Eventually, when the stopper is entirely dissolved, the water will rush in and fill the casing to cause the entire apparatus to sink to the bottom of the ocean. In this way, the danger of the apparatus falling into enemy hands is avoided.

The novel features that I consider characteristic of my invention are set forth with particularity in the appended claims. The invention itself, however, both as to its organization and method of operation, as well as additional objects and advantages thereof, will best be understood from the following description of one embodiment thereof, when read in connection with the accompanying drawings, in which Figure 1 is a side elevation of one form of detecting and transmitting apparatus constructed according to my present invention, the device being shown floating in water, Figure 2 is an enlarged, central, sectional view thereof, Figure 3 is an enlarged, central, sectional, detail view taken on the line III—III of Figure 2, Figure 4 is a similar, sectional view taken on the line IV—IV of Figure 2, Figure 5 is a similar, sectional view taken on the line V—V of Figure 2, and Figure 6 is a similar, sectional view taken on the line VI—VI of Figure 2.

Referring more particularly to the drawings, wherein similar reference characters designate corresponding parts throughout, there is shown a buoy 1 comprising a casing made in two halves 1a and 1b formed, respectively, with peripheral flanges 3a and 3b between which is disposed a gasket 5 of suitable waterproof material, preferably a cork and rubber composition. The casing parts 1a and 1b are held together in watertight relation by a plurality of nuts and bolts 6 which pass through the flanges 3a and 3b.

Within the casing part 1a is a suitable radio apparatus 7, such as a radio transmitter, supplied with power from a suitable power source 9, such as a battery, located in the casing part 1b. The casing part 1a carries an antenna 11 at the top, and suspended from the bottom of the casing part 1b through a suitable rubber covered cable 13 is an acousto-electrical signal translating device, such as a microphone 15. The microphone 15 is connected to the transmitter 7 and constitutes the input therefor, and the antenna 11 is also connected to the transmitter and constitutes the output therefor.

To provide water-tight connections between the antenna 11 and the microphone cable 13 on the one hand, and the casing parts 1a and 1b on the other, the couplings shown in Figures 3 and 4 may be employed. For this purpose, the casing part 1a is provided with a female coupling member comprising a sleeve 17 formed with a flange 17a which may be welded or otherwise suitably secured to the casing part 1a to provide a fluid-tight connection therebetween. The sleeve 17 is internally threaded and is formed with a shoulder or seat 19, as well as being provided with a central bore 21. A male coupling element 23 having a central bore 24 is externally threaded to threadedly mate with the sleeve 17. Molded on the elongated antenna 11 adjacent the lower end thereof is a rubber sleeve 25 having a flange 25a thereon. The lower end of the antenna 11 may be provided with a jack or the like 27 by means of which connection may be made to the transmitter 7.

When the antenna and transmitter are to be assembled, a washer 29 of brass or the like is first placed on the seat 19, after which the antenna 11 is inserted through the bore 21 of the coupling sleeve 17 until its molded flange 25a rests on the washer 29. Thereafter, a second washer 31 similar to the washer 29 is slipped over the molded sleeve 25, and the coupling element 23 is placed around the antenna and tightened down against the washer 31. The pressure thus applied to the flange 25a expands it against the threads in the sleeve 17 and forms a water tight connection.

The cable 13 also has molded thereon a rubber sleeve 33 formed with a flange 33a. The flange 33a may be seated against a shoulder 35 on an internally threaded, centrally bored, coupling sleeve 37 which is secured at its flange 37a in water-tight relation with the casing part 1b similarly to the coupling sleeve 17. An externally threaded, male, coupling element 39 having a central bore 40 fits around the molded sleeve 33 and mates with the female coupling element 37. After the cable 13 has been inserted through the hollow coupling element 37 into the casing and connected to the transmitter, the male element 39 may be tightened against a brass or similar washer 41 to provide the required fluid tight connection. Thereafter, the two casing halves may be clamped together tightly by the nuts and bolts 6, and the apparatus is ready for use. A plurality of strain reliefs 45 may be provided on the coupling element 39 to engage the cable 13 so as to relieve the strain thereon in well known manner.

The buoy 1 is normally filled with air in sufficient quantity to enable it to float on the surface of the water, approximately as shown in Figure 1. In this position, the antenna 11 extends upwardly from the casing part 1a, and the cable 13 is of sufficient length to hold the microphone 15 at a distance of approximately 30 to 50 feet below the surface of the water. To cause the apparatus to sink after its period of usefulness, there is provided on the bottom of the casing part 1b a tubular member 47 which is threaded into a female coupling element 49 secured to the casing part 1b similarly to the coupling sleeve 37, the tubular member 47 being tightened down against a rubber or other suitable washer 51 to provide a fluid-tight connection. The tubular member 47 is stoppered with a water soluble material, which may be either organic or inorganic, such as sugar, salt, or the like. I prefer, however, to employ a water soluble wax manufactured by the Carbide and Carbon Chemicals Corp. and sold under the trade name "No. 4,000 Carbowax." This material is well suited for the particular application here under consideration inasmuch as the time required for the water to dissolve it is almost in direct proportion to its length, and because the wave motion of the water does not appreciably change the dissolving time.

When the buoy is placed in the water, the inlet tube 47 is completely submerged and the stopper 53 gradually begins to dissolve. The tubular member 47 and its stopper 53 may be made of a length such that the stopper will be dissolved within a predetermined time after the buoy has been placed in the water. As soon as the stopper 53 is entirely dissolved, the water rushes in through the tubular inlet 47 and accumulates in the casing 1. When a sufficient quantity of water has entered the casing 1, the entire apparatus will sink to the bottom of the ocean.

To provide an outlet for the air which is entrapped within the casing 1, the antenna 11 is preferably made of a hollow rod having a longitudinal passageway 55 (Figure 5). The antenna 11 is also provided adjacent its lower end with a radial bore 57 which establishes communication between the interior of the casing 1 and the passageway 55, as well as with a second radial bore 59 adjacent its upper end, the bore 59 providing communication between the passageway 55 and the atmosphere. A tubular cap member 61 is preferably placed over the upper end of the antenna to prevent water from entering the bore 59 and thence through the passageway 55 and the bore 57 into the casing 1. The cap member 61 has an internal diameter which is slightly greater than the external diameter of the antenna rod 11 so as to provide a slight clearance 63 therebetween for passage of the air when it is forced out of the casing 1 in the manner heretofore described. A locking screw 65 provided with a flange 67 may be threaded into the upper end of the hollow antenna 11 to cause the flange 67 to bear against the cap member 61 through an interposed washer 69 and lock it in place on the antenna in water-tight relation therewith.

From the foregoing description, it will be apparent to those skilled in the art that I have provided a novel and simple means for rendering the apparatus expendable after its period of usefulness. Although I have shown and described my invention particularly with reference to a radio transmitter, it should be apparent that the invention is equally applicable to a radio receiver, in which case the antenna 11 would be a receiving antenna, the radio apparatus 7 would be a suitable receiver, and the signal translating unit 15 would be a loud speaker. If desired, also, a microphone may be substituted for the antenna 11 and audio signals therefrom fed to a suitable amplifying device which would take the place of the radio device 7, a loud speaker again being substituted for the microphone 15. It will also undoubtedly be apparent to those skilled in the art that, although I have shown and described but one embodiment of my invention, many other forms thereof, as well as changes in the particular form described, are possible within the scope of my invention. I therefore desire that my invention shall not be limited except insofar as is made necessary by the prior art and by the spirit of the appended claims.

I claim as my invention:

1. In radio signaling apparatus, the combination of means providing a hollow, normally fluid-tight casing, a radio device within said casing, said casing having air entrapped therein in a quantity sufficient to enable said casing to float on water, an antenna carried by said casing and having electrical coupling with said device, means extending upwardly from said casing and having a longitudinal passageway therein which has communication with the interior of said casing at its lower end and with the atmosphere at its upper end, an electro-acoustical signal translating unit also carried by said casing and having electrical coupling with said radio device, a tubular inlet member on said casing, and a consumable stopper in said tubular member, said tubular member becoming open when said stopper is consumed to thereupon admit water into said casing for forcing the air in said casing out through said passageway into the atmosphere and thereby causing said apparatus to sink in the water.

2. In radio signaling apparatus, the combination of means providing a hollow, normally fluid-tight casing, a radio device within said casing, said casing having air entrapped therein in a quantity sufficient to enable said casing to float on water, an antenna carried by said casing and having electrical coupling with said device, said antenna comprising an elongated rod having a longitudinal passageway therein which has communication with the interior of said casing at its lower end and with the atmosphere at its upper end, an electro-acoustical signal translating unit also carried by said casing and having electrical coupling with said radio device, a tubular inlet member on said casing, and a consumable stopper in said tubular member, said tubular member becoming open when said stopper is consumed to thereupon admit water into said casing for forcing the air in said casing out through said passageway into the atmosphere and thereby causing said apparatus to sink in the water.

3. In radio signaling apparatus, the combination of means providing a hollow, normally fluid-tight casing, a radio device within said casing, said casing having air entrapped therein in a quantity sufficient to enable said casing to float on water, an antenna carried by said casing and having electrical coupling with said device, said antenna comprising an elongated rod having a longitudinal passageway therein which has communication with the interior of said casing at its lower end and with the atmosphere at its upper end, an electro-acoustical signal translating unit also carried by said casing and having electrical coupling with said radio device, a tubular inlet member carried by said casing, and a water soluble stopper in said tubular member, said stopper being gradually dissoluble by the water to open said tubular member after a predetermined time interval following placement of said casing on the water for admission of the water into said casing for forcing the air therein out through said passageway into the atmosphere and thereby causing said apparatus to sink in the water.

4. The invention set forth in claim 3 characterized by the addition of a cap member on the upper end of said antenna rod around the outlet end thereof, said cap constituting a closure for said outlet end to prevent entrance of water therethrough into said casing.

5. The invention set forth in claim 3 characterized in that said antenna rod has a pair of radial bores therein, one adjacent its lower end and one adjacent its upper end, said lower bore affording communication between the interior of said casing and said passageway, and said upper bore affording communication between said passageway and the atmosphere, and characterized further by the addition of a cap member on the upper end of said antenna around said upper bore, said cap constituting a closure for said upper bore to prevent entrance of water therethrough into said casing.

WALLACE W. DEWHURST.